US00RE36816E

United States Patent [19]

Apprille, Jr. et al.

[11] E Patent Number: Re. 36,816

[45] Reissued Date of Patent: Aug. 15, 2000

[54] GUARD FOR RAZOR BLADE ASSEMBLY

[75] Inventors: Domenic V. Apprille, Jr., Arlington; Gary R. Miller, deceased, late of Bedford, both of Mass., by Carolyn A. Miller, administratrix; Frank E. Brown, Maidenhead; John B. Taylor, Reading, both of United Kingdom

[73] Assignee: The Gillette Company, Boston, Mass.

[21] Appl. No.: 08/768,800

[22] Filed: Dec. 18, 1996

Related U.S. Patent Documents

Reissue of:

[64] Patent No.: 5,249,361
Issued: Oct. 5, 1993
Appl. No.: 07/882,032
Filed: May 13, 1992

U.S. Applications:

[63] Continuation of application No. 08/619,107, Mar. 20, 1996, abandoned, which is a continuation of application No. 08/405,941, Mar. 17, 1995, abandoned.

[51] Int. Cl.[7] ..... B26B 21/14; B26B 19/42; B26B 21/00

[52] U.S. Cl. ..... 30/77; 30/34.2; 30/50

[58] Field of Search ..... 30/34.2, 50, 34.05, 30/38, 77, 90

[56] References Cited

U.S. PATENT DOCUMENTS

| | | | |
|---|---|---|---|
| 1,497,647 | 6/1924 | Smith | 30/34.2 |
| 1,565,680 | 12/1925 | Silverwood | 30/34.2 |
| 2,004,087 | 7/1934 | Testi | 30/12 |
| 2,040,345 | 5/1936 | Taylor | 30/34.2 |
| 2,098,036 | 11/1937 | Gore | 30/34.2 |
| 2,548,959 | 4/1951 | Eisenberg et al. | 30/35.2 |
| 2,568,047 | 9/1951 | Anderson | 30/34.2 |
| 2,600,880 | 6/1952 | Karle | 30/34.2 |
| 2,766,521 | 10/1956 | Benvenuti | 30/34.2 |
| 2,814,104 | 11/1957 | Miller | 30/34.2 |
| 3,722,090 | 8/1971 | Dawidowicz | 30/34.2 |
| 3,895,437 | 7/1975 | DiBuono | 30/90 |
| 3,939,560 | 2/1976 | Lyall | 30/34.2 |
| 4,211,006 | 7/1980 | Halaby et al. | 30/346.55 |
| 4,535,537 | 8/1985 | Ferraro et al. | 30/32 |
| 4,586,255 | 5/1986 | Jacobson | 30/50 |
| 4,777,722 | 10/1988 | Trotta | 30/77 |
| 4,813,131 | 3/1989 | Gruner | 30/50 |
| 4,813,731 | 5/1989 | Eltis | 30/50 |
| 4,866,844 | 9/1989 | Burout | 30/50 |
| 5,001,832 | 3/1991 | Althaus | 30/50 |
| 5,010,646 | 4/1991 | Neamtu | 30/50 |
| 5,056,222 | 10/1991 | Miller et al. | 30/77 |
| 5,067,238 | 11/1991 | Miller et al. | 30/34.2 |
| 5,113,585 | 5/1992 | Rogers et al. . | |
| 5,191,712 | 3/1993 | Crook et al. | 30/34.2 |

FOREIGN PATENT DOCUMENTS

| | | | |
|---|---|---|---|
| 0254491 | 1/1988 | European Pat. Off. | B26B 21/40 |
| 0366139 | 5/1990 | European Pat. Off. | B26B 21/40 |
| 1444545 | 8/1976 | United Kingdom . | |
| WO-91/19597 | 12/1991 | WIPO . | |
| WO9217322 | 10/1992 | WIPO | B26B 21/22 |

OTHER PUBLICATIONS

British Application 8825268—Priority Document for EP 0366 139.

*Primary Examiner*—Kenneth E. Peterson
*Attorney, Agent, or Firm*—Charles P. Boukus, Jr.; Edward S. Podszus

[57] ABSTRACT

A razor blade body in the form of a cartridge structure includes a guard member assembled thereon forward of, and extending parallel to, the blade or blades. The guard is of a two part molded structure having an upper portion of elastomeric material with a plurality of upwardly projecting protrusions formed thereon and a lower base portion of rigid plastic material having a downwardly projecting V-shaped cross-sectional portion. A pair of upwardly projecting elements are disposed in spaced relation forming a recess on the blade cartridge structure for receiving the V-shaped base portion therebetween and a latch means disposed in the recess retains the guard member in the assembled position.

26 Claims, 4 Drawing Sheets

GUARD FOR RAZOR BLADE ASSEMBLY

Matter enclosed in heavy brackets [ ] appears in the original patent but forms no part of this reissue specification; matter printed in italics indicates the additions made by reissue.

*This application is a continuation of application Ser. No. 08/619,107, filed Mar. 20, 1996, now abandoned, which is a continuation of application Ser. No. 08/405,941, filed Mar. 17, 1995, now abandoned which is a Reissue of U.S. Pat. No. 5,249,361.*

BACKGROUND OF THE INVENTION

The present invention relates to razor blade structures and more particularly to a guard for use in a razor blade body member.

It is known in the prior art to provide a razor blade assembly which may be connected to and used in conjunction with a razor handle to facilitate shaving operations. In U.S. Pat. No. 3,724,070, issued Apr. 3, 1973, in the name of Francis W. Dorion, Jr., there is shown a blade assembly in which blade means are held between the blade assembly surfaces adapted to engage the surface being shaved in front of and behind, respectively, cutting edge portions of the blade means. Such surfaces are generally referred to in the prior art as "guard" and "cap" surfaces.

In various blade assemblies shown in the prior art the guard, cap and blade means have been disclosed in various forms and in order to increase shaving efficiency and in some instances the individual components have been designed to move in response to forces encountered during shaving. In U.S. Pat. No. 4,168,571, issued Sep. 25, 1979, in the name of John F. Francis, there is shown a blade assembly in which the guard, cap and blade means are each movable independently of each other in dynamic fashion. U.S. Pat. No. 4,270,268, issued Jun. 2, 1981, in the name of Chester F. Jacobson, shows a blade assembly in which the guard and blade means are independently movable. Various other patents show a combination of guard, blade, and cap arrangements which are known, for instance U.S. Pat. Nos. 4,270,268, 4,488,357, 4,492,024, 4,492,025, 4,498,235, 4,551,916, 4,573,266, 4,586,255, 4,378,634, 4,587,729, and 4,621,424, all issued in the name of Chester F. Jacobson and assigned to the assignee of the present invention.

Further, in U.S. patent application Ser. No. 659,430, filed Mar. 21, 1991, in the name of Alan Crook, there is disclosed a skin engaging guard surface to be employed in the manner of guard surfaces disclosed in the above-referenced patents, which is designed to promote pleasant tactile sensations in the use of the razor and which tend to mask the sensations caused by contact of the blade edges with the skin and more significantly the facial hairs as they are severed. In the various embodiments of the referenced patent application Ser. No. 659,430, the skin engaging surfaces are provided, in one form or another with projections, arrayed in a substantial number so that forces between projections and the skin are widely distributed among the projections. In some embodiments, the surface configurations are provided by discrete filaments, fins or upstanding walls which are yieldable in use because of their inherent flexibility. In the manufacture of the guard surface, it is therefore essential that a material be employed which is capable of providing the flexibility in the projecting elements to produce the proper yielding under usage.

While the construction of the guard surface containing the flexible elements may be accomplished by the proper choice of material to produce the yieldable members, it is also necessary that the guard be mounted onto the razor blade body structure, whether it be a one-piece razor, disposable razor, or replaceable cartridge. In that the material chosen for the yieldable elements is not generally such that it would be possible to form the guard as an integral part of the razor blade body structure it is preferable that the guard be constructed as a separate unit. Further, as a separate unit, the yieldable material is not adaptable to attachment into the razor blade body structure, in its elongated form, without providing substantial support to produce proper positioning of the guard during usage of the razor blade body structure and for permanent retention of the guard within the razor blade body structure.

It is therefore an object of the present invention to provide a guard member to be employed in a razor blade body structure which is simple to manufacture and supplies ease of permanent installation into the razor blade body structure.

Another object of the invention is to provide a guard member of the type referred to which comprises a plurality of protrusions which are flexible for contacting a surface onto which the blade is supplied and which is rigid over portions thereof for support and retention within the razor blade body structure.

Yet another object of the invention is to provide a combination razor blade body structure and guard member disposed thereon wherein the guard member comprises a plurality of upwardly extending protrusions which are flexible for contacting the surface to which the blades are applied and which is easily and firmly affixed within the razor blade body structure.

SUMMARY OF THE INVENTION

The above objects, and other objects which will become apparent as the description proceeds are accomplished by providing an elongated guard member for assembly into a razor blade body structure which has a wall extending parallel with the blade or blades and disposed forward of the blades. The guard comprises a unitary molded member being formed of a bottom base portion of rigid plastic material providing a surface extending downwardly for juxtaposition adjacent the wall of the body structure along the length of the guard and an upper portion of elastomeric material having a plurality of protrusions projecting upwardly therefrom, extending linearly parallel with the blade edge and spaced one from the other in a direction transverse to the blade edge for contacting the surface onto which the blade is applied. Latch means are disposed on the base portion for engagement with the blade body structure to retain the guard member positioned in the blade body structure.

The guard base portion and guard upper portion are generally injection molded together in a two stage injection molding process, and at least one of the guard portions may be provided with a plurality of openings into which material of the other of the guard portions is disposed during the molding process to provide a locking engagement of the base portion and the upper portion, one to the other. The upwardly extending protrusions comprise a plurality of conical cross-section ribs extending along the upper surface of the guard upper portion and spaced one from the other.

The guard member latching means generally comprises a plurality of apertures formed in an outer surface of the guard base portion for receiving a detent disposed on the blade body structure.

The material for the guard base portion is generally of a rigid plastic such as polypropylene material and the elastomeric material chosen for the guard upper portion is one having a range of preferably 27 to 75 measured on the Shore A hardness scale. While a hardness of about 73 on the Shore A hardness scale is preferable, Shore A hardness values as high as 95 may be acceptable.

In combining the guard member into a razor blade body structure, it is preferable that the body structure have a pair of upwardly projecting elements in spaced relation one forward of the other forming a recess therebetween. The guard member is then formed of a bottom base portion of rigid plastic material having a substantially V-shape extending downwardly for interfitting engagement in the recess between the body structure upwardly projecting elements. The latch means then is comprised of a plurality of apertures formed in the outer surface of the guard base portion and a corresponding plurality of detents formed on at least one of the structure upwardly projecting elements for interconnecting engagement in the apertures.

At least one of the upwardly projecting elements on the razor blade structure may be formed of an elongated wall extending parallel to the blade or blades of the body and serving to substantially support the guard member, and the detents are formed on the elongated wall.

BRIEF DESCRIPTION OF THE DRAWING

Reference is made to the accompanying drawing in which there are shown illustrative embodiments of the invention from which its novel features and advantages will be apparent, wherein.

DESCRIPTION OF THE PREFERRED EMBODIMENT

Figure 1:
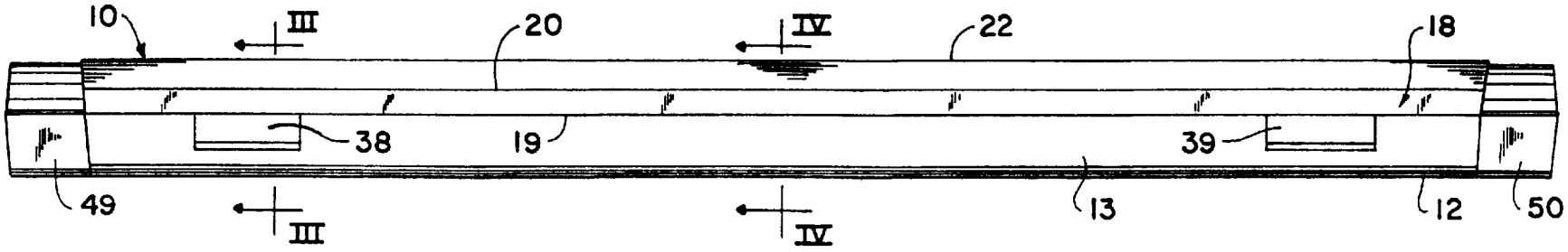
FIG. 1 is a front elevational view showing a guard having a plurality of elastomeric ribs, for use in a razor blade cartridge and constructed in accordance with the teachings of the present invention.
Figure 4:
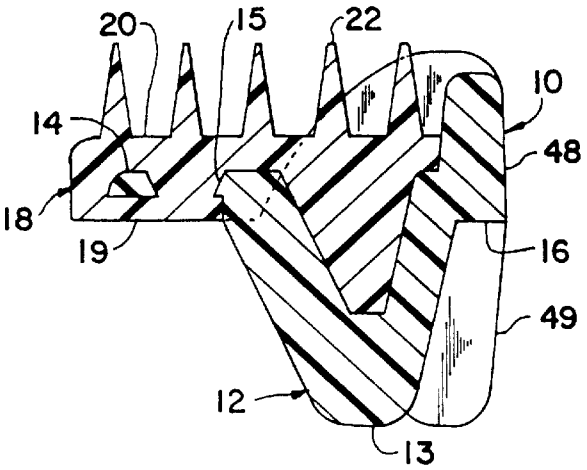
FIG. 4 is a sectional view taken along the line IV—IV of FIG. 1 showing details of the structure at the appropriate centerline.

Referring now to the drawing, and in particular to FIGS. 1 through 4, there is shown an elongated guard member 10 which is a unitary molded member formed of a bottom base portion 12 having a substantially V-shaped cross-sectional portion 13 extending downwardly and a forwardly projecting platform 14 having a plurality of circular openings 15 spaced along the length of the platform.

At the rear of the guard member 10 the V-shaped cross-section 13 terminates in a downwardly directed rear support surface 16, extending to a rear wall 48.

At either end of the guard member 10 the rear wall 48 extends downwardly to the depth of the V-shaped cross-section 13 to form a pair of downwardly projecting tabs 49 and 50. The elongated guard member 10 further comprises an upper portion 18 which is molded contiguous to the base portion 12 and substantially envelopes the platform 14, portions of the material of the upper portion 18 being deposited in the circular apertures 15 of the base portion 12. The upper portion 18 comprises a front support surface 19 and an upper surface 20 from which a plurality of protrusions in the form of conical cross-section ribs 22 extend upwardly and substantially over the length of the guard member 10 being spaced one from another on the surface 20.

The elongated guard member 10 is formed in an injection molding process of the two stage type providing for the employment of separate materials for the base portion 12 and the upper portion 18.

The upper portion 18 is of a thermo-plastic elastomeric material which is substantially chosen to provide a flexibility in the ribs 22 found necessary to provide the preferred tactile sensation during the shaving process. In order to produce this flexibility, the materials are chosen to have a hardness value in the range of 27 to 75 on the Shore A scale and materials which may be selected are Kraton G2705 having a hardness of 55 on the Shore A scale manufactured by the Shell Corporation, Evoprene #966 having a Shore A hardness value of 27 and distributed by Gary Chemical Corporation of Leominster, Mass., Santoprene 271-55 having a Shore A hardness value of 55 and Santoprene 271-73 having a Shore A hardness value of 73, both manufactured by Advanced Elastomerics Corporation.

The base portion 12 is required to provide rigidity over the length of the elongated guard member 10 and therefore a rigid plastic material is generally chosen both for support of the more flexible upper portion 18 and to cooperate with elements provided on a razor blade body to latch the guard member 10 into the razor blade body and retain it fixed during usage. As it will be observed in FIG. 4, the employment of the circular apertures 15 in the base portion 12 combined with the dual injection molding process produces a mechanical attachment of the upper portion 18 to the base portion 12. However, while a number of rigid plastic materials may be employed to manufacture the base portion 12, it is found that a more stable assembly is produced when a chemical bond is obtained between the base portion 12 and the upper portion 18 during the molding process and for this reason, a polypropylene material has been found to achieve this objective when employed in the molding process.

Referring now to FIGS. 5, 6, 8 and 9 taken in conjunction with the above-described FIGS. 1 through 4, there is shown a razor blade body in the form of a cartridge structure 24. The cartridge structure 24 with the exception of those elements to be described below is similar in construction and contains those elements for performing the shaving operation as generally described is U.S. Pat. Nos. 4,551,916, 4,498,235, 4,586,255, and 4,621,424, all issued in the name of Chester F. Jacobson and assigned to the assignee of the present invention. While a razor blade body member of this type may preferably be employed with the elongated guard member 10 it should be understood that various configurations of blade support, blade arrangement and operation could be employed equally with the present guard member, the guard member accomplishing its achieved objectives in the chosen constructions. As the blade and cap elements provided and shown in the aforementioned patents to Chester F. Jacobson are fully disclosed in those patents, which are incorporated herein by reference, they will not be described in detail herein as they do not relate to the present invention.

Figure 3:
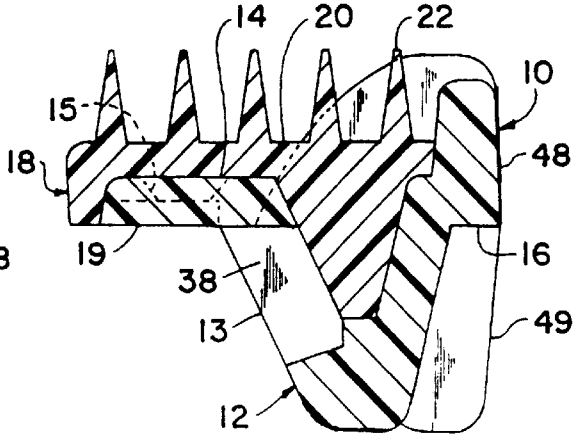
FIG. 3 is a sectional view taken along the line III—III of FIG. 1, showing details of the structure at the detent receiving portion thereof.
Figure 2:
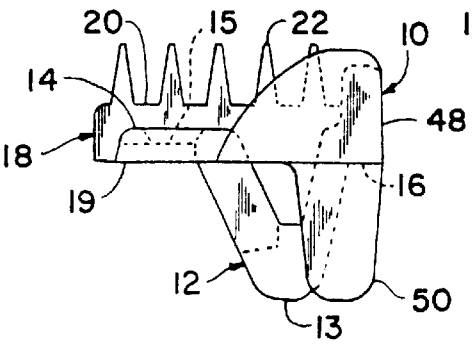
FIG. 2 is a left side elevational view of the guard of FIG. 1 showing details of the structure.
Figure 5:
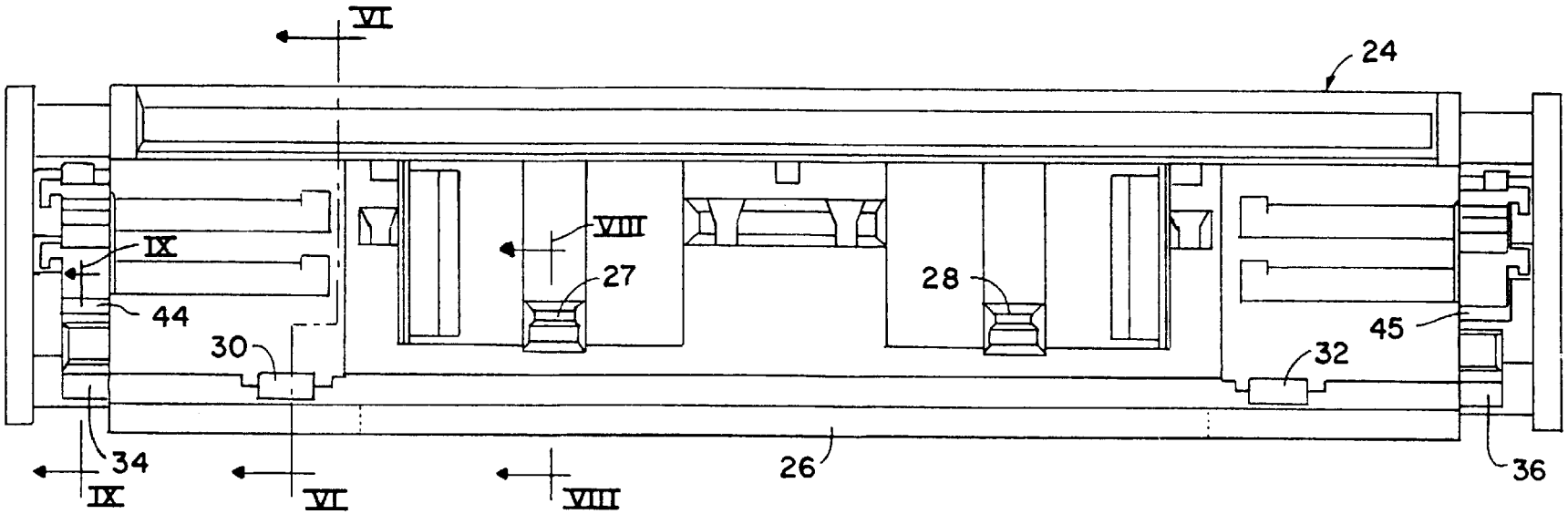
FIG. 5 is a top plan view of a razor blade cartridge body into which the guard of FIGS. 1 through 4 is assembled.

The cartridge structure 24 has at the forward end thereof, a pair of upwardly projecting elements in spaced relation one forward of the other in the form of an elongated wall 26 and a pair of upwardly projecting posts 27 and 28 are spaced from the wall a predetermined distance to form a recess therebetween, and a second pair of upwardly projecting posts 44 and 45 are disposed one at either end of the cartridge structure. The wall 26 is provided with two detents 30 and 32 which extend inwardly toward the posts 27 and 28 and a pair of upwardly facing surfaces 34 and 36 are disposed at either side of the cartridge structure 24. As best shown in FIGS. 1 and 3 of the drawing, the base portion 12 of the guard member 10 is provided with a pair of slotted openings 38 and 39 which are employed with the elements of the cartridge structure 24 to provide a latch means for retaining the guard member 10 in place in the assembly.

Figure 6:
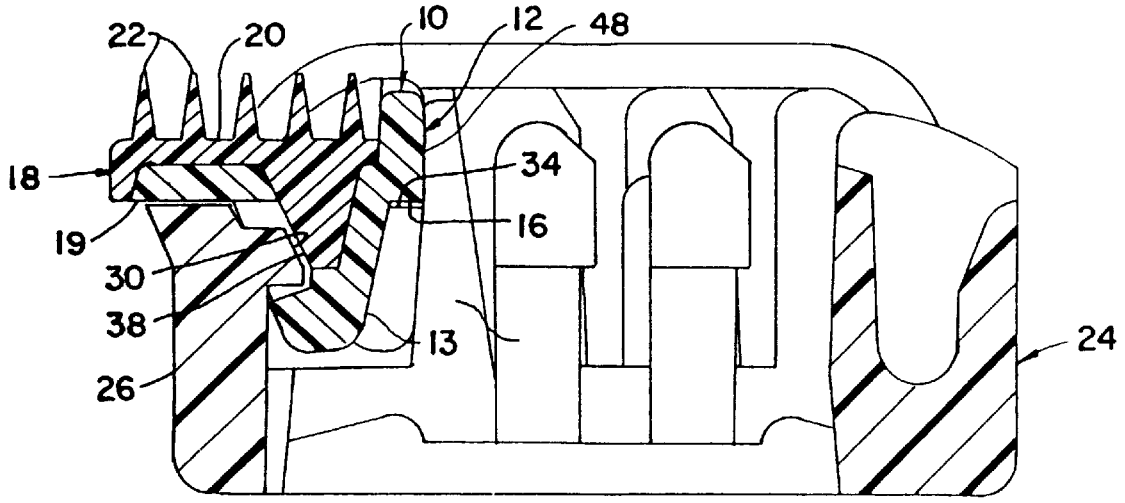
FIG. 6 is a sectional view taken along the line VI—VI of FIG. 5, but with the guard of FIGS. 1 through 4 in place, showing details of the latch construction.
Figure 8:
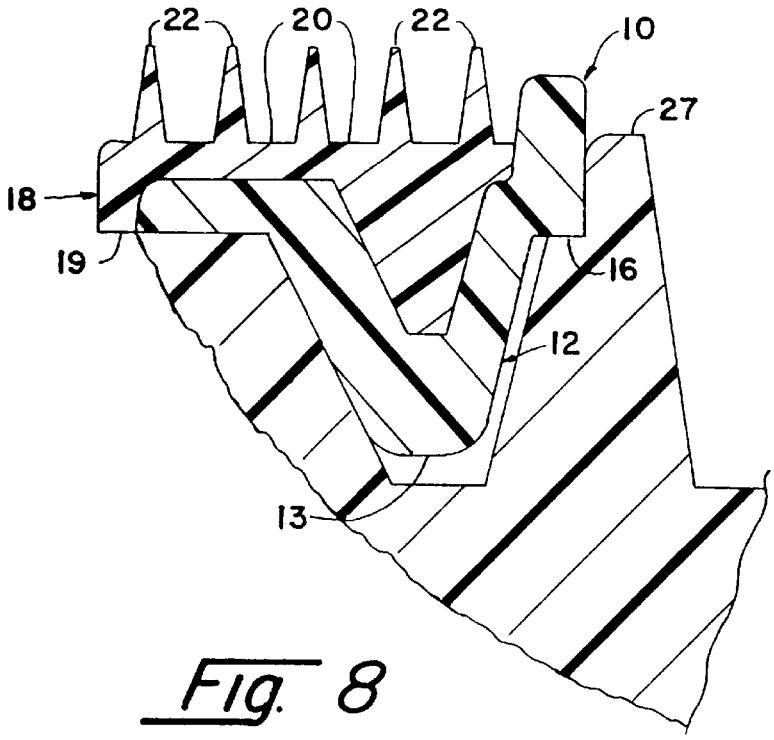
FIG. 8 is a partial sectional view taken along the line VIII—VIII of FIG. 5 showing further details of the razor blade cartridge body having the guard assembled therein.

The V-shaped cross-section of the base portion 12 is so constructed as to provide an interfitting engagement in the recess produced between the wall 26 and the posts 27 and 28, and the tabs 49 and 50 are received in the space between the end posts 44 and 45 and the rear wall behind the surfaces 34 and 32 respectively. As best shown in FIGS. 6 and 8, when the V-shaped cross-section 13 is forced between the wall 26 and the posts 27 and 28 the detents 30 and 32 snap into the slotted openings 38 and 39 and the rear wall 48 of the elongated guard member is positioned contacting the front surface of the posts 27 and 28, the front support surface 19 rests on the top surface of the wall 26 and the rear support surface 16 rests on the upwardly facing surfaces of the posts 27 and 28 to establish a rigid latch connection between the elongated guard member 10 and the cartridge structure 24. The tabs 49 and 50 further serve to support the guard member by virtue of the contact between the front surface of each tab with the rear wall 48 of the base portion 12, as best shown in FIG. 9.

Figure 9:
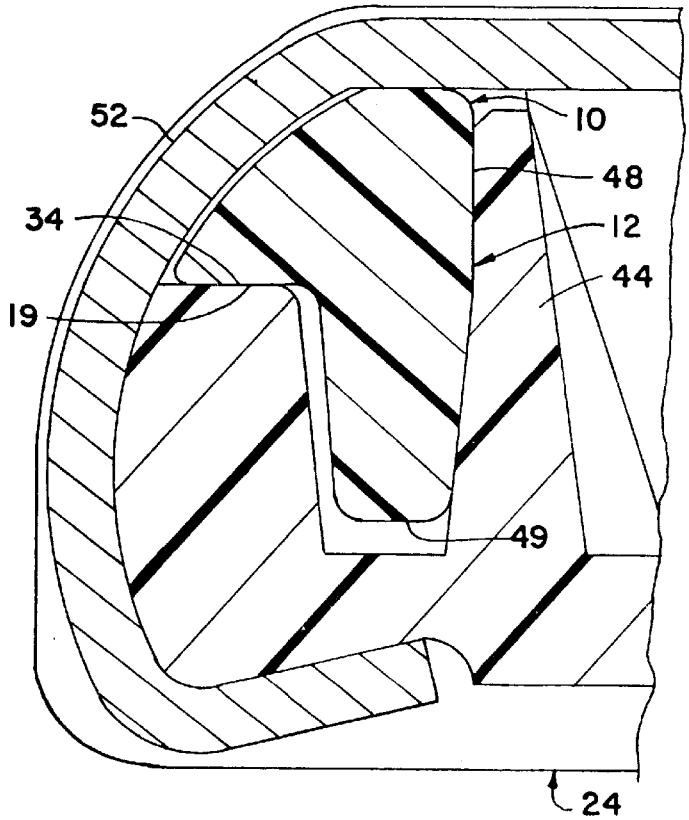
FIG. 9 is a sectional view taken along the line IX—IX of FIG. 5 showing the end assembly of the cartridge body and guard.

Referring still to FIG. 9, it will be noted that the assembly of the elongated guard member 10 to the cartridge structure 24 is completed by the addition of a pair of clips 52 (only one of which is shown), one at either end of the assembly. The clips 52 serve to retain the guard member 10 in place as well as to retain the blades (not shown) in position in similar fashion to those prior art patents cited herein.

Figure 7:
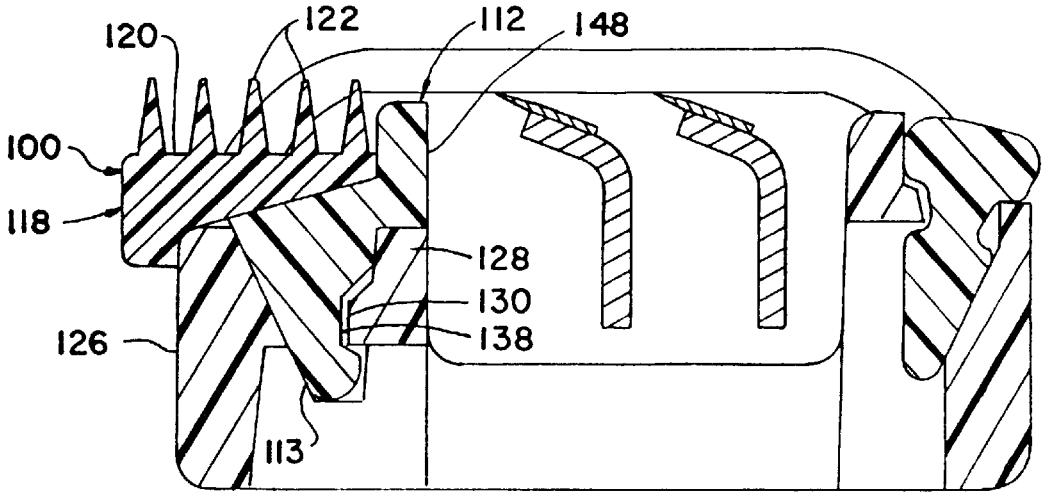
FIG. 7 is a sectional schematic view similar to FIG. 6 showing an alternate embodiment of the guard and cartridge body assembly having the latching construction disposed at the rear of the guard member.

While in the preferred embodiment the latch means comprises detents 30 and 32 disposed on the wall 26 with surface contact between the elongated guard member 10 and the posts 27 and 28, it is also considered that the invention employed in the elongated guard member 10 may be alternatively designed such that the latching arrangement would be as schematically shown in FIG. 7 of the drawing.

In FIG. 7, an elongated guard member 100 comprises a base portion 112 of rigid plastic material and an upper portion [18] *118* of elastomeric plastic material having the ribs 122 disposed on its upper surface 120. The manufacture and materials employed in the elongated guard member 100 may be identical to that described above with regard to FIGS. 1 through 6, however, as will be noted, a pair of slotted openings, the first of which is slot 138 and the second of which is not shown but is similar to slot 39 in FIG. 1, are disposed on the rear surface of the V-shaped cross-section 113 of the base portion 112 and are positioned to receive a pair of detents 130 being shown, disposed on a pair of posts 128 which is shown in FIG. 7. The surfaces of the V-shaped cross-section 113 are forced between the rear surface of the wall 126 and the forwardly facing surface of the posts 128 such that the elongated guard member 100 snaps into place with the detents 130 snapping into the slotted openings 138 in the rigid plastic base portion 113 to retain the guard member 100 onto the razor blade body during usage and is easily assembled to the razor blade body, in like manner to the elongated guard member 10 as described above.

While it is apparent that changes and modifications can be made within the spirit and scope of the present invention, it is our intention, however, only to limited by the appended claims.

As our invention we claim:

1. An elongated guard member for assembly into a razor blade body structure having a wall extending parallel with the blade and disposed forward of the blade, said guard member comprising a unitary molded member being formed of a bottom base portion of rigid plastic material providing a surface extending downwardly for juxtaposition adjacent the wall of the body structure along the length of the guard and an upper portion of elastomeric material having a plurality of protrusions projecting upwardly therefrom for contacting the surface onto which the blade is applied; and latch means disposed on said base portion for engagement with said body structure to retain said guard member so positioned in the blade body structure.

2. The guard member of claim 1 wherein said guard base portion and said guard upper portion are injection molded together in a two stage injection molding process.

3. The guard member of claim 2 wherein one of said guard portions is provided with a plurality of apertures into which material of the other of said guard portions is deposited during the molding process to provide a locking engagement of the base portion and upper portion, one to the other.

4. The guard member of claim 3 wherein said plurality of apertures are provided in said guard base portion.

5. The guard member of claim 4 wherein said plurality of upwardly projecting protrusions comprise a plurality of conical cross-section ribs extending along the upper surface of said guard upper portion parallel to a blade edge and spaced one from the other.

6. The guard member of claim 5 wherein said latching means comprises a plurality of openings formed in an outer surface of said guard base portion for receiving a detent disposed on the razor blade body structure.

7. The guard member of claim 6 wherein said guard upper portion is formed of an elastomeric material having a hardness in the range of 27 to 75 measured on the Shore A hardness scale.

8. The guard member of claim 7 wherein said guard base portion is formed of a polypropylene material.

9. The guard member of claim 1 wherein said plurality of upwardly projecting protrusions comprise a plurality of conical cross-section ribs extending along the upper surface of said guard upper portion parallel to a blade edge and spaced one from the other.

10. The guard member of claim 1 wherein said latching means comprises a plurality of openings formed in an outer surface of said guard base portion for receiving a detent disposed on the blade body structure.

11. The guard member of claim 1 wherein said guard upper portion is formed of an elastomeric material having a hardness in the range of 27 to 75 measured on the Shore A hardness scale.

12. The guard member of claim 11 wherein said guard base portion is formed of a polypropylene material.

13. In combination, a razor blade body structure having an elongated guard member disposed thereon forward of the blade or blades, and extending parallel thereto, said body structure further having a pair of upwardly projecting elements in spaced relation, one forward of the other forming a recess therebetween;

said guard member being formed of a bottom base portion of rigid plastic material of a substantially V-shape cross-section extending downwardly for interfitting engagement in said recess between said body structure upwardly projecting elements and an upper portion of elastomeric material having a plurality of protrusions projecting upwardly therefrom for contacting the surface onto which the blade is applied; and latch means disposed in said recess for interconnecting said base portion to at least one of said pair of upwardly projecting elements for retaining said guard member so positioned in said razor blade body structure.

14. The combination of claim 13 wherein said latch means comprises a plurality of openings formed in an outer surface of said guard base portion and a corresponding plurality of detents formed on at least one of said body structure upwardly projecting elements received in said openings.

15. The combination of claim 14 wherein one of said body structure upwardly projecting elements comprises an elongated wall extending parallel to the blade or blades of said body structure and serving to substantially support said guard member.

16. The combination of claim 15 wherein said detents are formed on said elongated wall.

17. The combination of claim 13 wherein said guard base portion and said guard upper portion are injection molded together in a two stage injection molding process.

18. The combination of claim 17 wherein one of said guard portions is provided with a plurality of apertures into which material of the other of said guard portions is disposed during the molding process to provide a locking engagement of the base portion and upper portion, one to the other.

19. The combination of claim 18 wherein said plurality of apertures are provided in said guard base portion.

20. The combination of claim 13 wherein said plurality of upwardly projecting protrusions comprise a plurality of conical cross-section ribs extending parallel to a blade edge along the upper surface of said guard upper portion and spaced one from the other.

*21. The guard member of claim 1 wherein said bottom base portion includes a rigid rear wall projecting upwardly from said base portion and including a top surface disposed between said blade and said upwardly projecting protrusions of said upper portion.*

*22. The guard member of claim 21 wherein said plurality of protrusions of said upper portion extend beyond said top surface of said rear wall of said bottom base portion of said guard member.*

*23. The guard member of claim 21 wherein said rear wall includes a front surface projecting upwardly from said base portion adjacent to said protrusions.*

*24. The combination of claim 13 wherein said bottom base portion includes a rigid rear wall projecting upwardly from said base portion and including a top surface disposed between said blade and said upwardly projecting protrusions of said upper portion.*

*25. The combination of claim 24 wherein said plurality of protrusions of said upper portion extend beyond said top surface of said rear wall of said bottom base portion of said guard member.*

*26. The guard member of claim 24 wherein said rear wall includes a front surface projecting upwardly from said base portion adjacent to said protrusions.*

* * * * *